INVENTORS
NOAH S. DAVIS
JOHN W. MOHLMAN
BY
*Julian J. Schamur*
ATTORNEY

INVENTORS
NOAH S. DAVIS
JOHN W. MOHLMAN
BY
ATTORNEY

United States Patent Office 3,137,555
Patented June 16, 1964

3,137,555
WATER PURIFICATION PROCESS USING AN
ABSORPTION REFRIGERATION CYCLE
Noah S. Davis, Northridge, and John W. Mohlman, Woodland Hills, Calif., assignors to North American Aviation, Inc.
Filed Mar. 23, 1961, Ser. No. 97,926
12 Claims. (Cl. 62—58)

This invention relates to process for removing solute from solutions. In one embodiment, the process relates to the purification of sea water by concentration and removal of water having a relatively low salt concentration.

It has been proposed to obtain potable water and concentrated salt solution from sea water by a process which involves freezing the sea water into ice which is relatively free of dissolved salts, which ice is removed from the sea water and melted to give potable water. One method for obtaining less concentrated salt solutions from sea water by freezing involves freezing the sea water in direct contact with a volatile liquid refrigerant. In order to conserve energy in the system and produce relatively uncontaminated water at a reasonable cost, it is necessary to make the energy requirements of the process as low as possible. In order to operate the process with minimum energy input, the refrigerant gas produced in freezing the water is compressed and contacted with the ice, after separation from the brine, to condense and cool the refrigerant for reuse in the freezing operation.

In order to make this process even more economically attractive, it has been suggested that the incoming sea water to be purified be pre-cooled to near its freezing point prior to being frozen in direct contact with the refrigerant. The preferred method for pre-cooling the incoming saline involves direct contact heat-transfer with a supplemental cooling fluid which is relatively immiscible with the water and which has a vapor pressure such that it will not appreciably volatilize during the heat exchange process.

In all such processes inert gases dissolved in the solution must be removed as a first step in the process or vented at some step during operation of the process. Thus, it has been suggested that the sea water to be purified first be deaerated and then subjected to the process steps. Alternatively, inert gases may be vented from the system when the compressed refrigerant from the freezing step is condensed in contact with the ice formed. Deaerating the water prior to subjecting it to the freezing process increases the energy requirements of the system, while venting the inert gases in the condensation step entails a large loss of refrigerant vapors. Both of these procedures greatly increase the cost of converting the sea water into water fit for consumption or industrial use. For an economical process it is not possible to avoid venting inerts if the deaerator is not employed, since the concentration of inerts constantly builds up in the compressor cycle and still further increase the energy requirement of the system.

In the process which employs a supplemental low vapor pressure heat-transfer medium for pre-cooling the incoming sea water further problems of stream contamination arise. For example, when kerosene and butane are used as the heat-transfer medium and refrigerant respectively, and where the cold effluent brine and purified water are heat exchanged with the kerosene, then butane carried along in the water and brine will contaminate the kerosene. This will tend to dilute the kerosene and increase its vapor pressure. Further dissolved inert gases, such as oxygen and nitrogen, will tend to concentrate themselves in the butane refrigerant cycle. Thus, loss of butane refrigerant and heat-transfer medium and mutual contamination arise from the operation of such a process.

It is, therefore, an object of this invention to provide an improved process for purification of solvents by freezing the solvent in direct contact with a vaporizable liquid refrigerant. A further object of this invention is to provide an improved process for obtaining fresh water from the sea. Another object of the invention is to provide a solvent purification process which minimizes refrigerant and heat-transfer medium contamination and loss and minimizes the work necessary in delivering warm refrigerant vapors to the melting operation.

In the drawings accompanying this specification,

Figure 3:
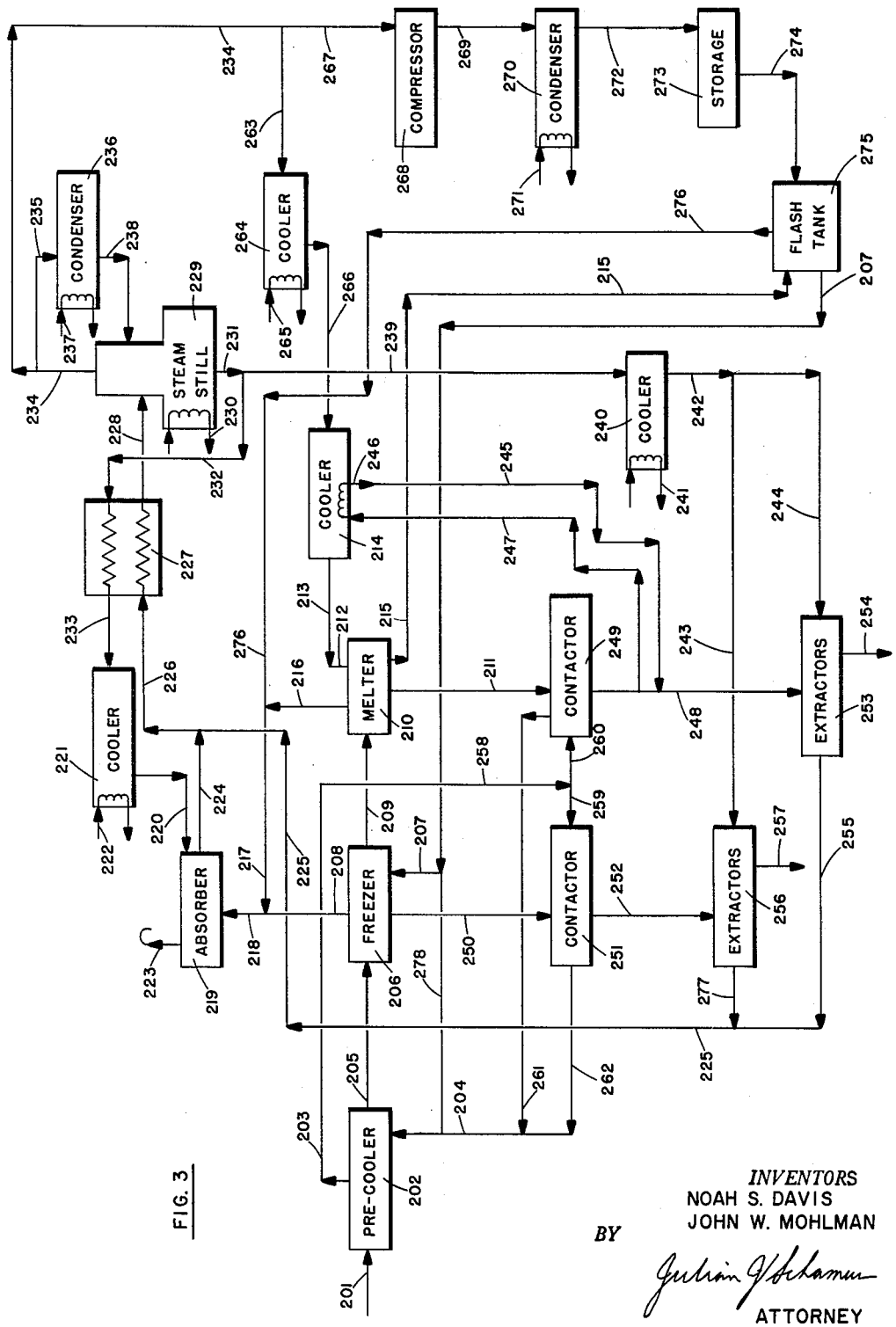

While FIG. 3 is a schematic diagram of another process of this invention which employs a single refrigerant to freeze, melt, cool, and heat exchange, and which also employs a relatively high boiling liquid to absorb the refrigerant.

The objects of this invention are accomplished by providing a process for separating less concentrated solution from a relatively more concentrated solution which includes the steps of forming solids in a solution of intermediate concentration by direct contact with a vaporizable liquid refrigerant, separating the solids from residual solution and subsequently forming a liquid from the solids by contacting the solids with warmed refrigerant vapors, obtaining the warmed refrigerant vapors by absorbing vapors formed in producing the solids into a quantity of relatively low vapor pressure liquid in which the refrigerant is soluble, and separating the refrigerant and the low vapor pressure liquid by distillation.

The process of this invention is applicable to system wherein a component of a solution is separated from the solution by the formation of solids and residual solution by transferring energy from the solution. Thus, the recovery of relatively demineralized water from aqueous solutions such as sea water by freezing or by refrigerant hydrate formation may be effected by the process of this invention. Additionally, the concentration of solutions to remove a portion of the solvent in which either the solvent or the concentrate is the desired product is enhanced by the practice of this invention. The invention is, therefore, applicable to a process for preparing frozen concentrates such as orange juice and frozen concentrated coffee. In addition, the application of freezing or solid formation may be employed as a step in the preparation of dehydrated products ordinarily containing water. Similarly, the process has application to methods for recovering essentially all the solvent from the solution to prepare a solid product.

A preferred embodiment of the invention relates to the recovery of fresh water from saline solutions such as sea water, brackish waters, or other unpotable water containing dissolved material such as inorganic salts. A particularly preferred embodiment is the recovery of fresh water from sea water by partially freezing the sea water. In such a process, the incoming sea water is pre-cooled to near its freezing point by one of several methods. The pre-cooling may be accomplished by conventional indirect heat exchange with a cooling medium. It is preferred to accomplish cooling by direct contact with a heat exchange medium which may be the same fluid as is employed as a refrigerant. However, it is extremely advantageous to pre-cool the sea water in direct contact with a liquid heat-transfer medium having a lower vapor pressure than the refrigerant. In a particularly preferred embodiment of this invention, the heat-transfer medium has a low solubility for the gaseous components of the sea water and a high solubility for the particular refrigerant employed.

After pre-cooling, the sea water is partially frozen in direct contact with the vaporizable liquid refrigerant, thus forming refrigerant vapors, ice and residual brine. At this point in the process the gases dissolved in the sea water tend to accumulate in the refrigerant vapors formed. The residual solution and ice are separated and the ice may be washed with additional sea water, which has preferably been pre-cooled, to remove residual more concentrated brine adhering to the ice crystal. If desired, an additional wash with relatively pure water may be provided to further remove occluded brine from the ice. In order to conserve material and energy in the system, the washings may be recirculated to the freezing operation.

The refrigerant vapor containing the gases picked up from the sea water are absorbed into a carrier liquid and separated therefrom at a higher temperature and employed in melting the ice to produce the desired fresh water product. When water is removed from the sea water by hydrate formation the vaporizing refrigerant forms a hydrate in the freezing step and this hydrate is decomposed by the refrigerant vapors.

The product water and residual brine from the freezing process are both at significantly lower temperatures and may be used to cool the heat-transfer medium so that it may be reused to cool additional incoming sea water. This may be accomplished by conventional indirect contact of the brine and water with the heat-transfer medium. It may also be accomplished by direct contact with brine and water with refrigerant when the refrigerant is employed as the initial heat-transfer medium. Preferably, however, the supplemental heat-transfer fluid employed in indirect contact to pre-cool incoming sea water is cooled by direct contact with product brine and water and is reused in the cooling step.

In the freezing and melting steps refrigerant tends to dissolve in the brine and water product streams and must be recovered from these streams in order to provide an economic process.

In order to free the refrigerant stream of dissolved gas, the present invention provides that the refrigerant in the cycle be absorbed into a fluid in which it is soluble and in which the gaseous components of air are relatively insoluble. In this way only the refrigerant becomes dissolved in the absorbing fluid and inert gases may be vented from the system without loss of valuable refrigerant. Simple distillation or stripping means may be used to separate the refrigerant from the absorbing fluid for return to the system at a higher temperature, and higher pressure if desired, for use in melting the ice.

In order to recover the refrigerant dissolved in the product brine and water streams, an embodiment of this invention provides that these streams be contacted with a fluid having a low miscibility with water and in which the refrigerant is sufficiently soluble so that it is extracted from the aqueous phase into the water-immiscible fluid. Refrigerant may then be recovered from this fluid by stripping or distillation at the same time producing the ice-melting vapors. This separation is conducted simultaneously with the separation of refrigerant from the fluid in which it is absorbed to free the system of dissolved gases and deliver warm refrigerant to the melter. Thus, it is particularly preferred that the absorbing fluid and the water-immiscible fluid be the same.

Another aspect of this invention provides for the heat-transfer medium, the water-immiscible fluid and the fluid employed as the refrigerant absorber to be the same. In this embodiment of the invention the steps of warming the residual brine and product water are combined with extraction of the products to remove dissolved refrigerant.

When the incoming sea water is pre-cooled in direct contact with the immiscible fluid a small portion of the fluid contaminates the water. When the water is transferred to the freezing operation the water-immiscible fluid tends to carry over into the refrigerant vapor phase and thus further contaminate the refrigerant. This invention has the advantage of eliminating the need for separating the heat-transfer fluid from the refrigerant. All the refrigerant and heat-transfer medium are separated in the same stripping or distillation process employed for delivering warm refrigerant vapor to the melter.

In order to maintain a proper balance of energy in the system a portion of the effluent distilled refrigerant from the still may be compressed and cooled prior to reuse in the process rather than being used as a medium for melting the ice. Alternatively, the effluent mixture of refrigerant and liquid from the absorber may be split into two streams, the larger of which is mixed with high vapor pressure liquid from the pre-cooler and distilled under pressure. The smaller portion is distilled at a higher pressure and the refrigerant recovered, cooled, and returned directly to the freezer.

Although the above illustration has been given with respect to the recovery of water from sea water, the process of this invention is equally applicable to the purification and concentration of other solutions not only by way of freezing to recover solvent but by way of freezing to recover solute and by hydrate formation to free the solution of solvent.

In the accompanying drawings miscellaneous pumps, valves, control units, and several optional cooling operations have not been illustrated since the drawings are intended as schematic representation of the process of this invention.

Figure 1:
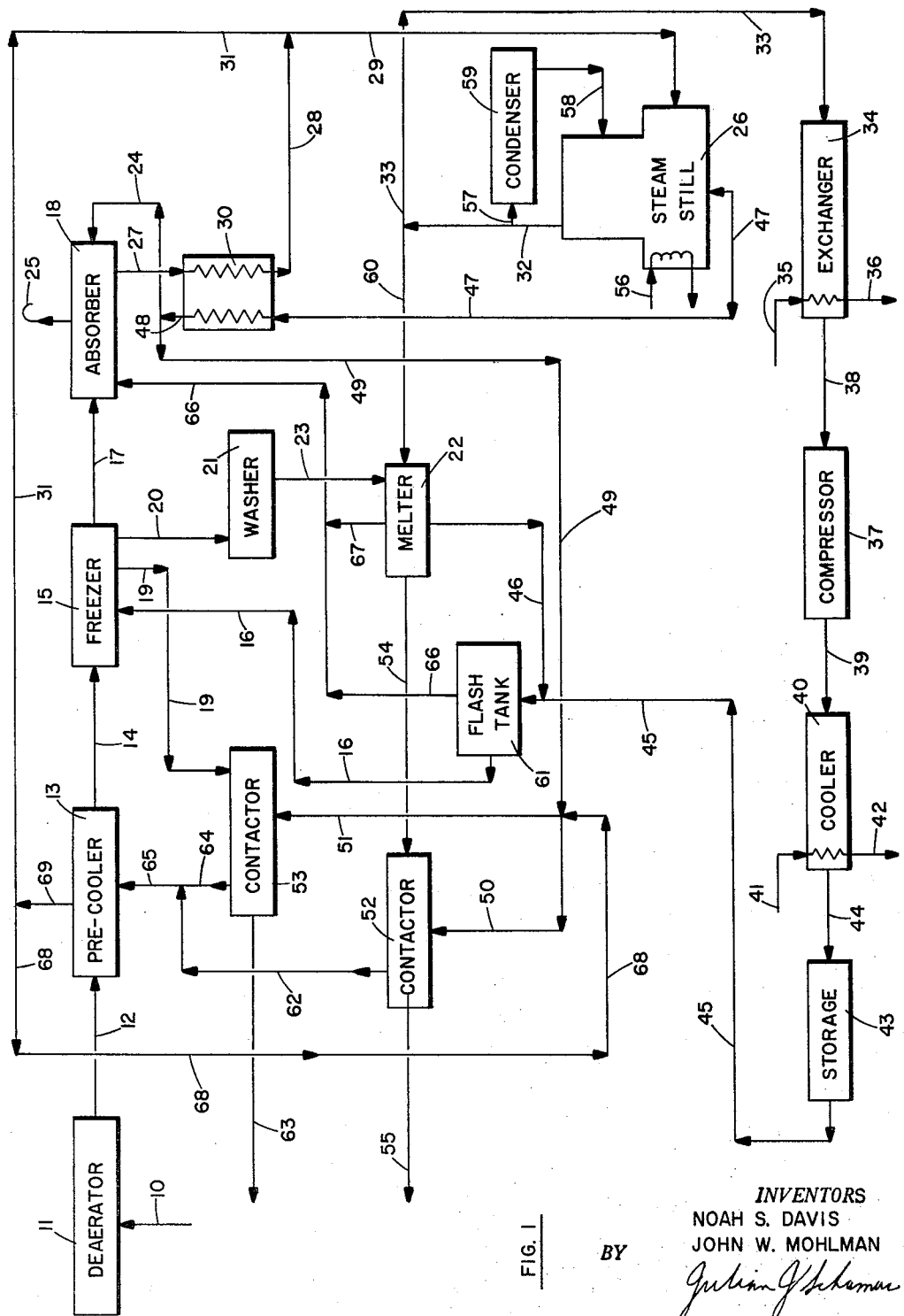
FIG. 1 is a schematic diagram of a process employing a relatively non-volatile heat-transfer and absorber medium in conjunction with a vaporizable liquid refrigerant according to an embodiment of this invention.

With specific reference to the accompanying drawings, FIG. 1 illustrates an embodiment of this invention for recovering demineralized water from sea water. Unprocessed sea water from storage or other convenient source enters a deaerator 11 through line 10, where it is stripped, as far as economically practical, of dissolved components of air, such as oxygen, nitrogen, and carbon dioxide. It is not necessary to employ a deaerator in the process of this invention as provision is made in a subsequent portion of the process for removing dissolved inert gases. Since the deaerator is never completely effective, it may be dispensed with but removal provisions in subsequent portions of the process are absolutely required. When the deaerator is employed, sea water leaves through line 12 and enters the pre-cooler 13 where it is cooled in direct contact with relatively high vapor pressure liquid, such as heptane. Heptane enters the pre-cooler through line 65 and leaves through line 69. The water leaves the pre-cooler through line 14 to the freezer 15 after being cooled to approximately the freezing point. In the freezer 15 the cooled sea water is contacted with a vaporizable refrigerant such as butane entering the freezer 15 through line 16 as a liquid preferably below the freezing point of sea water. In the freezer 15 the butane is vaporized and exits via line 17 to the absorber 18. Vaporization of the butane causes a portion of the water in the sea water to freeze to ice crystals. Brine is drained from these crystals and leaves the freezer 15 through line 19, while the ice crystals with some occluded brine are transferred from the freezer 15 via line 20 to a washer 21 where occluded brine may be removed by washing the ice with either unprocessed sea water, fresh water, or a saline solution less concentrated than the residual brine. These washings may be collected and returned to the freezer 15. The washed ice is removed to the melter 22 via line 23, preferably on a slurry in water. Any suitable arrangement of freezer-washer-and-melter may be used in the process of this invention and the vessels 15, 21, and 22 may represent one or more of each unit or, in certain instances, one or more of the vessels may be eliminated, the functions being combined into a single vessel.

The butane vapor produced in the freezer 15 passes into the absorber 18 via line 17 where it is dissolved in liquid heptane entering through line 24. A complete absorption of the butane in the heptane is accomplished by controlling the flow and temperature, and may be achieved by spraying the heptane into the absorption column. The absorption column is preferably cooled with an internal circulating cooling fluid such as sea water. Any gases not absorbed into the heptane in absorber 18 are released from the system through the vent 25. In this manner, any dissolved air released from the water at any step of the operation is released from the system, the solubility of the air components being much lower in the heptane than in liquid butane.

The mixture of butane and heptane produced in the absorber 18 passes to the stripping operation in steam still 26 via lines 27, 28, and 29, and heat exchanger 30 where the mixed liquid is warmed. Before entering the stripper 26, the mixture is combined in line 29 with a portion of the effluent heptane from the pre-cooler 13 via line 31. The stripper is essentially a distillation unit which may operate under pressure and which is heated, for example, by steam coils 56 to effect a separation of the heptane and butane and, if desired, to obtain butane vapors at a higher pressure than they leave the freezer 15. For best operation of the still 26, a portion of the refrigerant may be refluxed through lines 57 and 58 via the condenser 59. Relatively pure butane leaves the stripper 26 via line 32 and is split into two streams. The greater majority of the high pressure butane vapors are returned direct to the melter 22 via line 60 for use in melting the ice. The remainder of the butane is passed through line 33 and cooled with unprocessed sea water in the heat exchanger 34. Sea water enters the heat exchanger via line 35 and exits at 36. The cooled butane is then fed to compressor 37 via line 38 and heat produced in the compression step is removed by conducting the vapor from compressor 37 via line 39 to a second cooler 40 in which the vapors are liquefied by indirect contact with sea water entering at 41 and leaving at 42. Liquid butane may be collected in a storage tank 43 after passing through line 44 and, as needed, is conducted via line 45 to flash tank 61.

Liquid butane resulting from the melting of ice in the melter 22 is combined with liquid butane from the storage tank 43 in tank 61 after passing through line 46. Cold liquid butane is delivered to the freezer from tank 61 through line 16. In order to maintain the proper temperature, a part of the butane in tank 61 may be flashed in a vapor through line 66 to the absorber 18.

The still bottoms produced in the stripper 26 are essentially pure liquid heptane and are removed from the stripper through line 47 and cooled in the heat exchanger 30. The effluent from heat exchanger 30, passing through line 48, separates into two streams 24 and 49. The stream 24 is the input to the absorber 18, while that portion flowing through line 49 is again split into fractions which flow through lines 50 and 51, along with heptane from pre-cooler 13 flowing through line 68, to the product water contactor 52 and brine contactor 53, respectively. In the water contactor 52, product water resulting from the melting of ice is carried via line 54 to the product water contactor 52 where it absorbs heat from the heptane entering through line 50. The warmed water leaves the contactor through line 55 for storage, use, or further process. The cooled heptane leaves the product water contactor via line 62. Concentrated brine resulting from the freezing process is conducted from the freezer 15 via line 19 to the brine contactor 53 where it is warmed in direct contact with the heptane entering through line 51. Warmed brine leaves the contactor through line 63 for further processing or disposal. Cooled heptane leaves the contactor 53 through line 64 and is combined with the effluent from the water contactor 52 from line 62. The combined effluent from the brine contactor 53 and water contactor 52 join in line 65 and are used to pre-cool additional incoming sea water in the pre-cooler 13, thus completing the cycle.

Thus, provision has been made for delivering warm refrigerant vapors to the melter 22 without the need of compressing the total vapor output of the freezer 15. The process of delivering warm butane vapor to the melter has been combined with a method for removing impurities from the process streams, thus effecting a savings in process steps and equipment.

Make-up butane and heptane may be added to the system to compensate for minor losses. Butane is advantageously added to the storage tank 43, while heptane lost with effluent products may be added through line 24 for use in the absorber 18.

Figure 2:
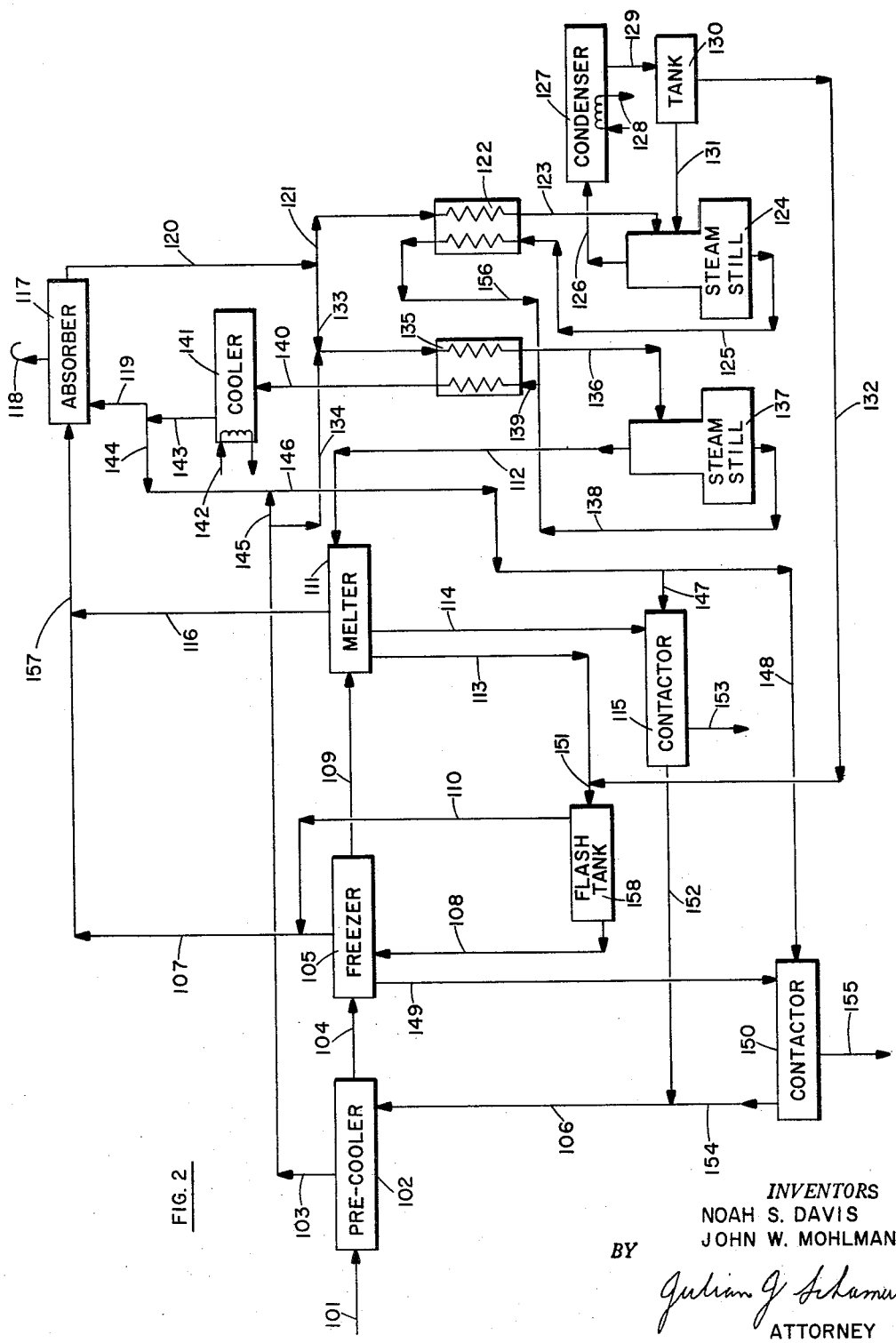
FIG. 2 is a schematic diagram of a process employing a relatively non-volatile heat-transfer medium and absorbent along with a vaporizable refrigerant in which the need for compressing refrigerant is completely eliminated.

In the process illustrated in FIG. 2, sea water enters the pre-cooler 102 through line 101 to be cooled to near its freezing point in direct contact with cold kerosene entering through line 106. Thus cooled sea water, containing a small amount of kerosene, leaves the pre-cooler 102 via line 104 to the freezing and melting operation, while the kerosene warmed in the pre-cooler 102 exits through line 103 and is split into two portions. The majority of the kerosene from the sea water pre-cooler 102 is admitted to contactors 115 and 150 through lines 145, 146, 147, and 148. Sea water which has been pre-cooled in the pre-cooler 102 passes through line 104 to the freezer 105 where it is partially frozen in direct contact with cold liquid butene-1 entering through line 108. The freezing is accompanied by evaporation of the liquid refrigerant to form butene-1 vapors, which vapors are taken through lines 107 and 157 to the absorber 117. These vapors contain some of the dissolved air from sea water and some kerosene entering the freezer 105 from the pre-cooler 102.

Residual brine containing dissolved butene-1 is removed from the brine-ice mixture in the freezer 105 and carried through line 149 to the brine contactor 150 where it is used to cool kerosene. Ice and some residual brine are carried from the freezer 105 to the melter 111 through line 109. A washer may be provided for freeing the ice of as much residual brine as possible by partial melting or washing with unprocessed sea water from the precooler 102. Residual wash water from the washer may be discharged or recirculated to the freezer. The ice may also be further subjected to washing with demineralized water to remove any additional occluded brine prior to transfer to the melter.

In the melter 111 washed ice, preferably slurried in cold water, enters through line 109 and is melted in direct contact with warm butene-1 vapors entering through line 112. During the melting process dissolved components of air coming in with the ice slurry are transferred to the butene-1 and a partial pressure of air components is created in the melter. In order to prevent a build up of gas pressure in the melter 111, it is desirable to provide a gas bleed line 116 which operates to release excess pressure, should any develop, by a suitable valve mechanism. Any gas flowing through line 116 joins refrigerant vapors from line 107 and is taken to the absorber 117 through line 157. In the melting process, butene-1 vapors are condensed to cold butene-1 liquid and leave the melter through line 113 while water resulting from the melting process which is contaminated with butene-1 leaves the melter through line 114 for subsequent removal of the butene-1 in contactor 115. The butene-1 liquid stream leaving the melter 111 through line 113 joins with liquid butene-1 flowing through line 132 and is admitted to flash tank 158 through line 151. The liquid butene-1 is further cooled in the flash tank 158 by evaporation of a portion thereof. The evaporated butene-1 leaves the flash tank 158 through line 110 and joins with butene-1 vapors from the freezer in line 107. The butene-1 cooled flows as a liquid through line 108 from the flash tank 158 for return to the freezer for freezing additional cooled sea water.

Cold effluent brine from freezer 105 is taken through line 149 to the contactor 150 where it is warmed in direct contact with warm kerosene from the pre-cooler 102 and other parts of the system to be described. Similarly, product water from the melter 111 flows through line 114 to the contactor 115 to be warmed with kerosene. Warmed kerosene from the pre-cooler 102 flows through lines 103, 145, 146, and 147 prior to entry into the contactor 115. A portion of the kerosene in line 146 flows through line 148 to the contactor 150. In contactor 150 butene-1 in the reject brine stream is extracted into the kerosene and a small amount of kerosene leaves the system with reject brine flowing through line 155 for disposal, use or further processing. In a similar fashion, product water entering contactor 115 gives up dissolved butene-1 to kerosene entering through line 147 and a small amount of kerosene leaves the system with product water leaving the contactor 115 through line 153. Thus, the contactors 115 and 150 serve the dual function of giving up heat from the system to the product streams and extracting butene-1 refrigerant from these streams.

Cold kerosene leaving contactor 115 via line 152 and contactor 150 through line 154 joins in line 106 for re-admission to the pre-cooler 102. These streams contain dissolved butene-1 extracted from the effluent products.

In order to remove the butene-1 carried in the kerosene through pre-cooler 102, the effluent kerosene from the pre-cooler flowing through line 103 is split into two streams which flow through lines 145 and 134. As explained above, the kerosene in 145 is readmitted to the contactors 115 and 150 and represents most of the kerosene flowing through line 103. The kerosene flowing through line 134 is carried through heat exchanger 135 and line 136 to the still 137 where it is freed of butene-1.

In order to provide the warm butene-1 vapor required to melt the ice in melter 111, the comparatively cold butene-1 vapor in line 157 is absorbed into kerosene in the absorber 117. Kerosene enters the absorber through line 119 in sufficient quantity to dissolve the butene-1. Since any gaseous components of air carried into the absorber are relatively insoluble in kerosene they tend to remain in the vapor phase and are released to the system through the vent 118. The absorber 117 may be cooled to facilitate absorption of the refrigerant with a minimum volume of kerosene. This cooling may be accomplished in any conventional manner, such as by providing coils with circulating cold water. The mixed stream of butene-1 absorbed in the kerosene is taken from the absorber 117 through line 120 from which it is split into two streams, 121 and 133. A small amount of the mixed stream passes through line 121 into heat exchanger 122 where it is warmed in indirect contact with relatively pure kerosene flowing from the still 124 through line 125. The warmed mixed stream leaves the heat exchanger 122 through line 123 and is admitted to the still 124 where the butene-1 and kerosene are separated. In the still 124 kerosene is stripped of butene-1 in any convenient manner, such as providing steam coils to effect the distillation. Pure butene-1 is taken overhead through line 126 and condensed by cooling, as shown at 127. The cooler-condenser 127 may be cooled with unprocessed sea water through coils 128, or in any other convenient manner. Condensed butene-1 is then collected via line 129 in tank 130 and a small portion may be readmitted to the still as a reflux through line 131. However, the major portion of the liquid butene-1 from tank 130 is taken through line 132 to the freezing-melting cycle via lines 151 and flash tank 158.

The major portion of the mixed stream of kerosene and butene-1 effluent from the absorber 117 is carried through lines 120 and 133 where it joins with butene-1-contaminated kerosene from the pre-cooler 102 flowing through line 134 and is warmed in the heat exchanger 135 by warm kerosene entering through line 139. The mixed stream entering the heat exchangr 135 is taken through line 136 and admitted to the primary still 137 where the butene-1 and kerosene are separated. It is preferable to operate the still 137 at somewhat lower pressure than the still 124, although both are preferably heated at superatmospheric pressures. The still 137, as still 124, is heated in any conventional fashion to separate the kerosene and butene-1. Butene-1 is taken overhead from still 137 as a vapor and flows through line 112 for use in melting ice in the melter 111. To balance the heat required in the melter, butene-1 vapors in line 112 may be cooled to the desired temperature in any convenient manner prior to use in melter 111. The flow of mixed stream through the still 137 is controlled to provide sufficient butene-1 vapor to melt all the ice entering the melter. If desired, the still 137 may be operated with a partial reflux. The kerosene bottoms from still 137 are taken through line 138 where they join kerosene from the still 124 flowing through line 156 via line 125 and heat exchanger 122. The kerosene in lines 156 and 138 combine and flow through line 139 and through the heat exchanger 135, where they are cooled in the process of prewarming the mixed stream input to still 137. The pure kerosene stream leaves the heat exchanger 135 through line 140 and is further cooled in the cooler 141 which employs cooling medium from any conventional source in the coils 142. The cooled pure kerosene stream leaves the cooler 141 through line 143 and the major portion flows through line 119 to the absorber 117. In order to compensate for the kerosene removed from the contactor cycle through line 134 for purification and for kerosene lost in effluent streams, an equivalent amount of pure kerosene is taken from line 143 through line 144 for return to the contactor cycle in line 146.

Thus, the embodiment of this invention illustrated in FIG. 2 provides for removing butene-1 from the kerosene stream simultaneously with providing warm butene-1 vapors for melting of ice. The need for compressors is completely eliminated by use of absorber 117 and the separation sequence in stills 124 and 137. In addition, dissolved gases are removed from the system in the absorber 117 by the vent 118 and refrigerant is extracted from the effluent streams in the contactors 115 and 150.

Although FIG. 2 illustrates an embodiment employing two distillation units, this has been done only as a matter of convenience. The process of this invention is equally applicable to an absorption system using only a single distillation step, at a higher pressure, or at dual pressure conditions. In this embodiment all of the refrigerant output of the distillation unit may be admitted to the melter, or a portion may be cooled and allowed to by-pass the melter through a suitable flash unit.

Since a small amount of kerosene is constantly lost from the system through lines 155 and 153, provision must be made for a make-up stream. This may be done at any convenient point in the cycle, for example, in line 146 before the kerosene splits into lines 147 and 148. Alternatively, kerosene may be admitted to the system directly into the absorber 117 through suitable valve in-line 119. Further, a small amount of butene-1 vapor may be lost from the system and make-up butene-1 should be provided. A convenient method for accomplishing butene-1 make-up is to provide a liquid butene-1 source connected directly into line 132 for admission to the system through line 151 and flash tank 158.

FIG. 3 is a schematic diagram of an embodiment of the invention using a single refrigerant heat-transfer fluid. The sea water may be led from storage through line 201 to a pre-cooler 202 where it is cooled by direct contact with a cold liquid refrigerant such as isobutane entering through line 204.

Although the process is not illustrated with a deaerator, inclusion of a deaerator is optional since dissolved air is removed at a subsequent stage of the process. A deaerator has the advantage that partial pressure of air in the refrigerant vapor cycle may be somewhat reduced. However, since the removal of dissolved gases in the deaerator is not complete and since the solubility of the dissolved gases is greater in isobutane than in water, inerts tend to build up in the refrigerant cycle even when the deaerator is employed prior to the pre-cooler 202.

The effluent cooled sea water from the pre-cooler 202 is taken through line 205 to the freezer 206. Warmed liquid isobutane leaves the pre-cooler via line 203 and a major portion flows through line 258 to water contactors 251 and 249 after splitting into streams 259 and 260. The cooled sea water is admitted to the freezer 206 and cold isobutane enters through line 207. The isobutane and sea water may be mixed before entering the freezer 206. The liquid isobutane vaporizes in the freezer and thus freezes a portion of the water. Isobutane vapor is taken from the freezer 206 through lines 208 and 218 and is absorbed into octane in the absorber 219. Concentrated brine resulting from the freezing is removed from the freezer 206 through line 250 to the contactor 251, while the ice formed and some of the residual brine is transferred through line 209 to the melter 210. The ice and residual brine may be washed with a small portion of pre-cooled sea water prior to entering the melter. Wash water and drainage from the ice crystals may be readmitted to the freezer. It is also desirable to wash the ice with a small amount of water to remove residual brine prior to complete melting. In the melter 210 warm refrigerant entering through line 212 is condensed to a liquid in contact with the ice, thus melting the ice. The water produced from melting the ice contains some dissolved refrigerant and is removed via line 211 to the product water contactor 249, while liquid isobutane formed is removed through line 215 to the flash tank 275.

In the freezing vessel 206 and melter 210 dissolved air tends to transfer to the isobutane phase. In order to maintain a proper partial pressure of air in the melter and to effect gas removal from gas rich refrigerant, a portion of the vapor in the melter 210 may be bled through line 216 to the input of refrigerant vapor to absorber 219 through lines 217 and 218.

The greatest portion of the isobutane which was warmed upon contact with water in the pre-cooler 202 is conducted through lines 203 and 258 and split into streams 259 and 260 for use in the brine contactor 251 and product water contactor 249. In the brine contactor 251 concentrated brine from the freezer entering through line 250 is warmed by the direct contact with the isobutane which is thus cooled. Similarly, in the product water contactor product water flowing through line 211 is warmed in contact with the isobutane. Cooled refrigerant leaves the contactors 251 and 249 through lines 262 and 261 to be combined in line 204 for return to the pre-cooler 202.

The effluent liquid isobutane from the melter which collects in flash drum 275 along with isobutane from storage tank 273, is slightly cooled by flash evaporation of a small portion which is rich in dissolved gases. This flashed portion of the refrigerant leaves the flash drum 275 through line 276 to the absorption cycle. The remainder of the refrigerant in the liquid phase is then passed through line 207 to the freezer. An interconnection may be made between lines 207 and 204 by way of a suitable valve to adjust isobutane flow to the freezer and the pre-cooler 202 to compensate for isobutane taken from the freezer cycle in product streams.

The refrigerant vapor in line 218, the effluent product water from the contactor 249 in line 248, and the effluent brine from contactor 251 in line 252 are contaminated. The refrigerant is rich in dissolved gases while the effluent brine and water are contaminated with refrigerant. In order to remove inert air from the system and strip the effluent brine and water of refrigerant for return to the system, and to deliver warm refrigerant at a suitable pressure to the melter, these streams are purified by absorption into a liquid which is a good solvent for the refrigerant and a poor solvent for water and the components of air. Thus, the effluent brine flowing through line 252 is passed into extractor 256 where the dissolved isobutane is transferred into octane entering through line 243 from the still 231 via line 239, cooler 240, and lines 242 and 243. Effluent brine leaves the absorber through line 257 for discard, storage or further processing. The extractor 256 is operated at a temperature convenient to remove the refrigerant from the water. The octane-containing isobutane leaves extractor 256 through line 277 and is heat exchanged with effluent octane from the still 229 in the heat exchanger 227 after being combined with other streams. The effluent octane from the extractor 256, after passing through lines 277, 225, and 226, and heat exchanger 227, is fed to the still 229 through line 228. Similarly, effluent product water leaving the contactor 249 through line 248 enters a second extractor 253 where it is stripped of isobutane by a second octane stream flowing from the still 229 through lines 231, 239, cooler 240, and lines 242 and 244. Product water, free of refrigerant, leaves the extractor 253 through line 255 and is admitted to the still 227 via lines 225, 226, heat exchanger 227, and line 228.

In order to remove inert gases from the system as a first step in providing isobutane vapors at the proper temperature and pressure conditions for melting the ice in the melter 210, effluent refrigerant vapors from the freezer 206 passing through line 208 and combined with refrigerant vapors from the flash tank 275 and vapors from the melter bleed line 216, in line 127, enter the absorber 219 via line 218. The octane-absorbing liquid enters the absorber 219 through line 220 at a rate sufficient to dissolve the entering refrigerant. Any vapors not absorbed are vented through the vent 223, thus freeing the system of the components of air entering the pre-cooler 202. The mixed streams of isobutane and octane are taken from the absorber 219 through line 224 where they join with octane-containing butane extracted from the products in the extractors 256 and 253. The mixed isobutane-octane streams are combined in line 226 and pass through the heat exchanger 227 where they are warmed with pure octane returned from the steam still 229 through lines 231 and 232. The warmed mixed stream passes from the heat exchanger 227 to the still 229.

The still may be heated in any convenient manner such as by steam coils, shown at 230, and effects the separation of octane and isobutane preferably at an elevated pressure. Isobutane-free octane leaves the still through line 231 and may be separated into two streams 232 and 239 for use in the absorber and extractor cycles, respectively. The octane passing through line 232 is employed to pre-cool the mixed stream passing through line 226 in the heat exchanger 227. The pure octane leaves the heat exchanger 227 through line 233. Although FIG. 3 shows the effluent octane in line 231 splitting into lines 232 and 239 prior to entering the heat exchanger 227, it is often desirable to pre-warm the incoming octane-isobutane stream in line 226 with all of the octane output of the still. Thus, the entire output of the still may flow through lines 231, 232, the heat exchanger 227, and then split into two streams for return to the absorber and another for return to the extractor cycle. It is desirable to further cool the effluent octane in lines 233 and 239 prior to reuse in the absorber 219 and extractors 253 and 256. This may be accomplished by cooling with unprocessed sea water in coolers 221 and 240, shown with coils 222 and 241. Octane from the cooler 221 is taken to the absorber 219 through line 220, thus completing the absorbing and stripping portion of the cycle, while octane from the cooler 240 is returned to the extractor cycle through line 242. Pure isobutane is taken overhead from the still 229 and passed through line 234, the major portion passing to cooler 264 through line 263. A portion of the isobutane may be refluxed in the still, as shown by line 235, condenser 236 with cooling coil 237, and return line 238. The condenser 236 may employ indirect contact cooling with a cooling medium such as unprocessed sea water through coil 237. The refrigerant in cooler 264 is cooled in any convenient fashion, as with cooling coil 265, and for further optional cooling in cooler 214 with product water flowing from line 248 through line 247, coils 246, line 245, for return to line 248. The isobutane from cooler 214 is then admitted to the melter through lines 213 and 212 for use in melting ice. Coolers 214 and 264 are regulated to deliver isobutane to the melter at a temperature sufficient to cause liquefication of the refrigerant while melting the ice.

A portion of the refrigerant vapor output of the still 229 may, if desired, be taken through lines 234 and 267, compressed in the compressor 268 and carried through line 269 to the condenser 270, where the vapors are condensed by indirect contact with a cooling medium such as unprocessed sea water flowing through coils 271. The condensed liquid is then conducted through line 212 to the storage tank 273 and taken as needed through line 274 to the flash tank 275 where it is combined with isobutane liquefied in the melter.

As in the processes illustrated in FIG. 1 and FIG. 2, it is also desirable to provide for replacement of any octane and isobutane dissipated in the process illustrated in FIG. 3. Make-up octane may be admitted to the system in any convenient location, for example into line 220 for initial use in absorber 219 by a suitable valve arrangement. Make-up isobutane may enter the system by a suitable valve arrangement into line 272 for entry into storage tank 273. Depending upon the temperature of operation, isobutane may tend to accumulate in either the freezer-melter cycle or the pre-cooler-contactor cycle. Provision may be made for adjusting the relative amount of isobutane in each of these. Thus, line 278 is provided between lines 207 (the refrigerant input to the freezer) and line 204 (isobutane input to the pre-cooler). Line 278 should be equipped with appropriate reversible pumps and valves so that if an excess or deficiency of isobutane develops in either cycle it may be transferred between the two. It is convenient to have the interchange between the freezer and the pre-cooler since the isobutane entering each of these units is relatively cooled and in a liquid state. If necessary, additional means may be provided as an adjunct to the control line 278.

Thus, the process has been illustrated using only a single refrigerant-heat-transfer medium. The refrigerant is conserved in the system by extraction and steam distillation, and air and inert gases are removed without the loss of valuable refrigerant. Delivery of warm refrigerant for melting ice is accomplished together with stream purification without the need for directly compressing refrigerant vapors formed in the freezer.

Refrigerants applicable to the present process include the lower aliphatic and olefinic hydrocarbons having a boiling point below that of the solution to be purified. In addition, halogenated hydrocarbons and other vaporizable refrigerants may be employed. Examples of applicable refrigerants include the hydrocarbons having from 2 to 4 carbon atoms such as propane, butane, isobutane, butene-1, butene-2, isobutylene, methylchloride, and various fluoro carbons, as well as carbon dioxides, ammonia, and the like. The refrigerant need not be a pure single refrigerant, but may be a mixture either blended to suit the needs of a particular cycle, or an available mixture such as field butane or LPG. It is of course, preferred that the refrigerant be relatively insoluble in the solution being treated. Thus, in a process for obtaining potable water from the sea water, the lower hydrocarbons and halogenated hydrocarbons are preferred.

The supplemental heat-transfer medium or absorber fluid employed in the process should be a relatively low vapor pressure inert liquid. For example, when processing sea water to produce fresh water, as illustrated in FIGS. 1 and 2, the heat-transfer medium may be a liquid higher aliphatic hydrocarbon which is a liquid from about 25° F. to about 100° F., such as hexane, heptane, octane, or commercially available mixtures of aliphatic, olefinic, and aromatic hydrocarbons derived from crude petroleum. Kerosene and gasoline are examples of such petroleum-derived liquids suitable as a heat-transfer medium. These same fluids are applicable to the embodiment of the invention illustrated in FIG. 3.

In another embodiment of this invention the degree of purification process streams may be minimized by employing mixtures of relatively high vapor pressure and relatively low vapor pressure liquids as the refrigerants. For example, in the process illustrated in FIG. 3, the refrigerant may be a mixture of propane and n-octane containing 32.2 mol percent propane and 67.8 mol percent octane. This mixed refrigerant vaporizes at 30° F. at 20 lb. per square inch absolute pressure. A further example of a mixed refrigerant is that composed of 62.4 mol percent isobutane and 37.6 mol percent n-octane which has a bubble point of 30° F. at 20 p.s.i.a. The requirement for such a mixed refrigerant in the process of this invention is that it completely volatilizes at the temperature and pressure conditions employed in the freezing vessel. Such mixed refrigerants have an advantage of minimizing the amount of stream purification necessary to remove the soluble portion of the refrigerant from the effluent product and waste streams. Since, in general, the higher boiling hydrocarbons are less expensive than the high vapor pressure refrigerants, the use of mixed refrigerants has the advantage that more of the low vapor pressure material will be lost in the effluent streams. Stream purification and delivery of warm refrigerant to the melter according to the present invention is accomplished without total compression and is employed to maintain proper balance of mixed refrigerants in the system.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A process for separating a less concentrated solution from a relatively more concentrated solution comprising the steps of (1) forming solids and the more concentrated solution from a solution of intermediate concentration by direct contact with a vaporizable liquid refrigerant thus forming cool refrigerant vapors; (2) separating said solids from said more concentrated solution; (3) forming said less concentrated solution from said solids by contacting said solids with warm refrigerant vapors; (4) obtaining said warm refrigerant vapors by absorbing all of said cool refrigerant vapors formed in step (1) into a quantity of relatively low vapor pressure liquid in which said refrigerant is soluble, and heating and separating said refrigerant and said low vapor pressure liquid.

2. A process for separating a less concentrated solution from a relatively more concentrated solution comprising the steps of (1) forming solids and the more concentrated solution from a solution of intermediate concentration containing dissolved gases by direct contact with a vaporizable liquid refrigerant thus forming cool refrigerant vapors; (2) separating said solids from said more concentrated solution; (3) forming the less concentrated solution from said solids by contacting said solids with warm refrigerant vapors, said refrigerant being contaminated with said dissolved gases, said less and more concentrated solutions being contaminated with refrigerant in steps (1) and (3); (4) absorbing all of said cool refrigerant vapors into a quantity of relatively low vapor pressure liquid in which said refrigerant is soluble, said low vapor pressure liquid having a relatively low solubility for said dissolved gases; (5) decontaminating said less and more concentrated solutions by absorbing said refrigerant therefrom into a portion of said low vapor pressure liquid; and (6) heating and separating said rerigerant from said low vapor pressure liquid to form said warm refrigerant vapors for use in step (3).

3. The process of claim 2, wherein said solution of intermediate concentration is sea water.

4. The process of claim 3, wherein said refrigerant is a lower aliphatic hydrocarbon.

5. The process of claim 4, wherein said low vapor pressure liquid is a higher aliphatic hydrocarbon.

6. In a process for separating less concentrated solution from a solution of intermediate concentration containing dissolved gases by (1) freezing said solution of intermediate concentration in direct contact with a vaporizable liquid refrigerant to form (a) cool refrigerant vapors, (b) solids comprising said less concentrated solution and (c) more concentrated residual solution, (2) separating said solids from said more concentrated residual solution, (3) melting said solids in direct contact with warm refrigerant vapor to form said less concentrated solution and cold liquid refrigerant, and (4) recirculating said cold liquid refrigerant to step (1), in which process said refrigerant becomes contaminated with said dissolved gases and said less and more concentrated solutions become contaminated with said refrigerant in steps (1) and (3), the improvement which comprises (A) absorbing all of said cool refrigerant vapor in a liquid of relatively low vapor pressure in which said refrigerant is soluble and in which said gases are comparatively insoluble to form a refrigerant-liquid mixture free of said gases, (B) separately contacting said residual solution and said less concentrated solution with a portion of said liquid of relatively low vapor pressure to extract said refrigerant and form additional liquid-refrigerant mixture and (C) distilling said liquid-refrigerant mixture from steps (A) and (B) to separate said low vapor pressure liquid from said refrigerant and form said warm refrigerant vapor for use in step (3).

7. In a process for obtaining relatively demineralized water from an aqueous solution containing dissolved gases by (1) freezing said solution in direct contact with a vaporizable liquid refrigerant to form cool refrigerant vapors, ice and residual brine, (2) separating said ice from said residual brine, (3) melting said ice in direct contact with warm refrigerant vapor to form water and cold liquid refrigerant, in which process said refrigerant becomes contaminated with said dissolved gases, and said solution and said water become contaminated with said refrigerant; the improvement which comprises removing said gases from said refrigerant and removing said refrigerant from said brine and said water and providing said warm refrigerant vapor by (A) absorbing all of said cool refrigerant vapors into a liquid having a low solvent power for said gases and a low solubility in said water and said solution, thus freeing said refrigerant of said gases, and (B) separately contacting said brine and said water with a portion of said liquid of said low solubility to dissolve said refrigerant in said liquid of said low solubility, and (C) distilling said refrigerant from said liquid of said low solubility to form said warm refrigerant vapor.

8. The process of claim 7, where in said refrigerant is isobutane and said liquid of said low solubility is octane.

9. In a process for separating relatively demineralized water from an aqueous solution containing dissolved gases by (1) pre-cooling said solution to near the freezing point in direct contact with an immiscible heat-transfer liquid, (2) freezing said solution in direct contact with a vaporizable liquid refrigerant to form cool refrigerant vapors, ice, and more concentrated residual solution, (3) separating said ice from said more concentrated residual solution, (4) washing said ice to remove occluded residual solution, (5) melting said ice in direct contact with warm refrigerant vapors to form water and cold liquid refrigerant, (6) recirculating said cold liquid refrigerant to step (2), and (7) directly contacting said residual solution and said water separately with said heat-transfer liquid from step (1), in which process said refrigerant becomes contaminated with said dissolved gases, the improvement which comprises absorbing all of said cool refrigerant vapors in a liquid of relatively low vapor pressure in which said refrigerant is soluble and in which said gases are comparatively insoluble to form a refrigerant-liquid mixture, and distilling said refrigerant-liquid mixture to separate said liquid from said refrigerant and form said warm refrigerant vapors.

10. The process of claim 9, wherein said heat-transfer liquid is said refrigerant.

11. The process of claim 9, wherein said heat-transfer liquid is said liquid of relatively low vapor pressure.

12. A process for obtaining potable water from sea water which comprises pre-cooling sea water containing dissolved gases to near its freezing point in direct contact with octane, partially freezing said sea water in direct contact with cold liquid isobutane refrigerant to form cool isobutane vapor, ice, and residual brine, thus contaminating said isobutane with said dissolved gases and contaminating said brine with said isobutane, separating said brine and said ice, washing said ice, melting said ice in direct contact with said warm isobutane vapor to form cold liquid isobutane and water contaminated with said isobutane, absorbing all of said cool isobutane vapor in octane, contacting said water and said residual brine with octane from the pre-cooling of said sea water to extract said isobutane, combining a portion of said octane which has contacted said brine and said water with said octane containing absorbed isobutane, and separating said isobutane from said octane to form said warm isobutane vapor.

References Cited in the file of this patent

UNITED STATES PATENTS

| 2,780,281 | Reinert | Feb. 5, 1957 |
| 2,821,304 | Zarchin | Jan. 28, 1958 |
| 2,904,511 | Donath | Sept. 15, 1959 |
| 2,997,856 | Pike | Aug. 29, 1961 |
| 3,070,969 | Ashley | Jan. 1, 1963 |
| 3,098,733 | Rosenstein | July 23, 1963 |

FOREIGN PATENTS

| 70,507 | Norway | June 3, 1946 |
| 217,766 | Australia | Oct. 16, 1958 |
| 841,374 | Great Britain | July 13, 1960 |

OTHER REFERENCES

Gilliland: "Fresh Water for the Future, Industrial and Engineering Chemistry," volume 47, Number 12, December 1955, pages 2410–2422.